United States Patent [19]

Ogishima

[11] Patent Number: 4,461,508
[45] Date of Patent: Jul. 24, 1984

[54] FAIRING ASSEMBLY FOR MOTORCYCLES
[75] Inventor: Tetsuo Ogishima, Saitama, Japan
[73] Assignee: Honda Giken Kogyo Kabushiki Kaisha, Tokyo, Japan
[21] Appl. No.: 378,357
[22] Filed: May 14, 1982
[30] Foreign Application Priority Data May 18, 1981 [JP] Japan .............................. 56-71712[U]
May 19, 1981 [JP] Japan ................................ 56-75505

[51] Int. Cl.³ ............................................ B62J 17/00
[52] U.S. Cl. ................................. 296/78.1; 280/289 S
[58] Field of Search .................. 296/78.1; 280/289 R, 280/289 S

[56] References Cited
U.S. PATENT DOCUMENTS 3,922,031 11/1975 Hugon ............................... 296/78.1
4,178,033 12/1979 Muth ................................. 296/78.1
4,198,093 4/1980 Muth ................................. 296/78.1
4,355,838 10/1982 Hickman ........................... 296/78.1

OTHER PUBLICATIONS
"Cycle World", Preview 77, Nov. 1976, p. 29.

Primary Examiner—Bruce H. Stoner, Jr.
Assistant Examiner—John A. Carroll
Attorney, Agent, or Firm—Sughrue, Mion, Zinn, Macpeak and Seas

[57] ABSTRACT

A fairing assembly for a motorcycle having a head light disposed at a front end of the fairing assembly, a meter unit indicative of running conditions of the motorcycle and turn signal units is disclosed. The turn signal units are disposed on both sides of the assembly. The turn signal units are each formed integrally with the fairing assembly. The fairing assembly is separated into upper and lower portions by a line connecting the head light to each turn signal unit. The upper portion may be used as a covering member for covering an upper portion of the head light and the rearside of the meter unit. The covering member is hinged at a front end thereof.

4 Claims, 7 Drawing Figures

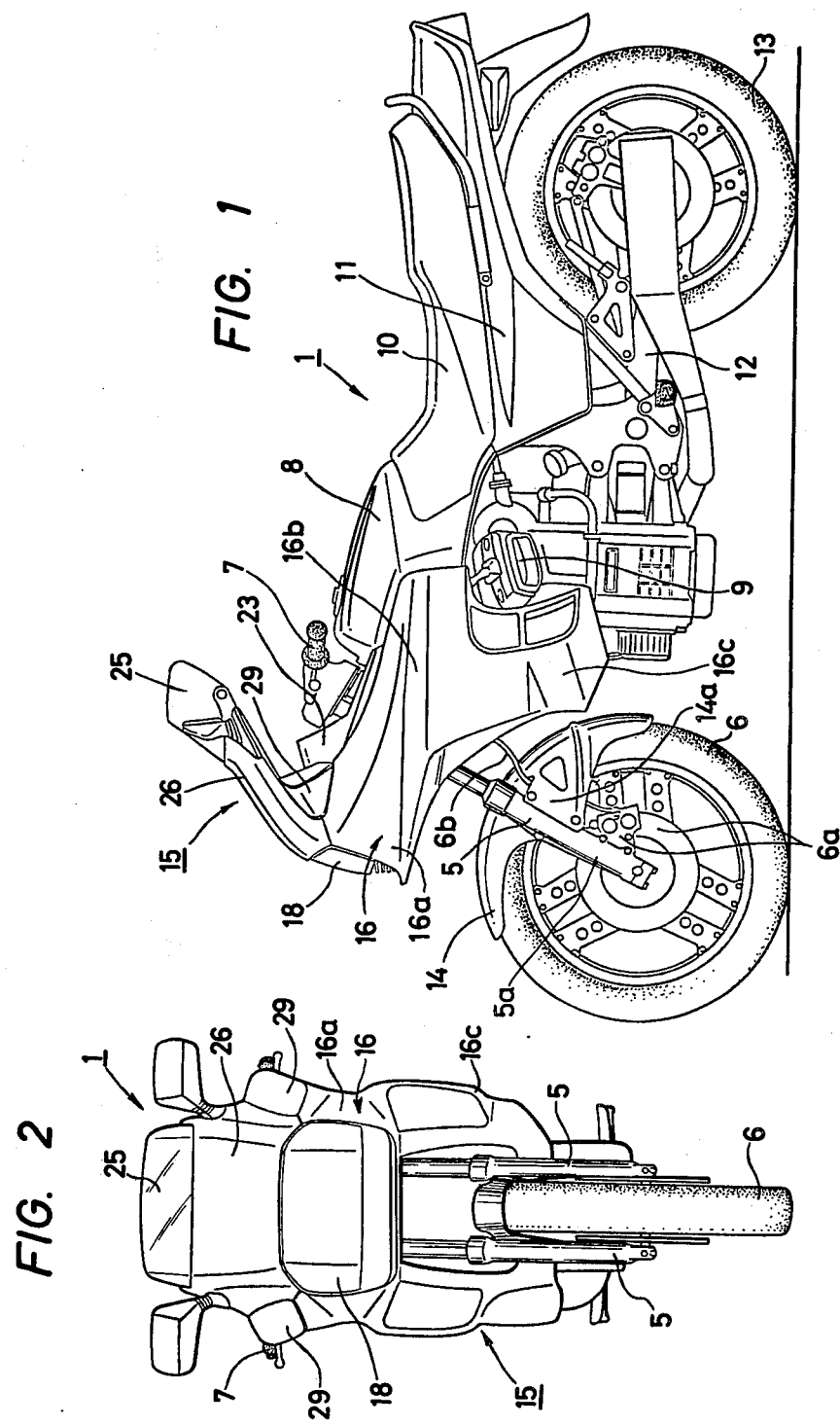

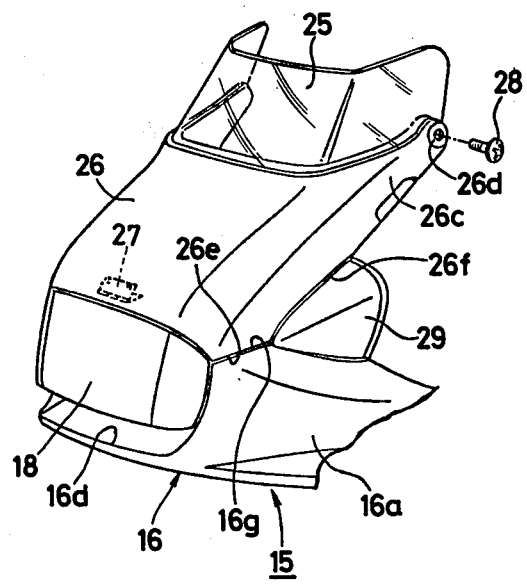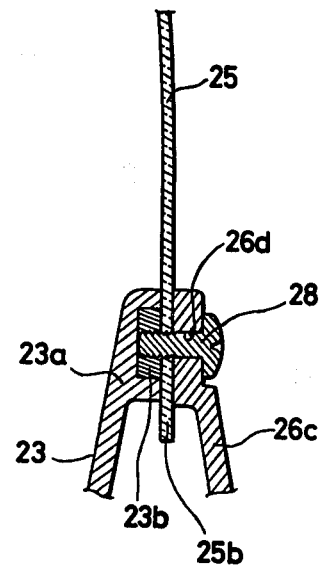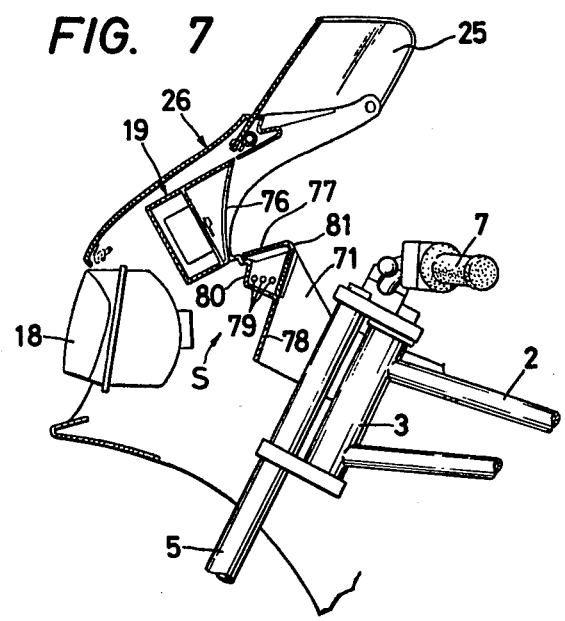

FAIRING ASSEMBLY FOR MOTORCYCLES

BACKGROUND OF THE INVENTION

The present invention relates to an improvement in a fairing assembly for covering an upper portion of a motorcycle.

A motorcycle is often provided on a front side with a fairing assembly which is used as a windshield or deflector. In the motorcycle, a head light is provided on a frontmost end of the fairing and at the same time a speedometer, a tachometer and other indicators are disposed in front of a steering handle. In case where these indicators are covered by a part of the fairing, in order to carry out the maintenance for the head light and the like, it is necessary to remove the fairing from the body, which makes the maintenance difficult. Also, fine adjustments of the units after assembling are difficult.

On the other hand, in such a motorcycle with the fairing, an opening through which a front fork of the motorcycle is extending is formed in the fairing. The opening must be large in size enough to enable the front fork to rotate without the interference of the edges of the opening. Therefore, there is a great possibility that dust and sand may pass through the opening and be blown upwardly to accumulate on front surfaces of the indicators, making them dirty.

SUMMARY OF THE INVENTION

In view of the above noted defects, an object of the present invention is to provide a novel fairing assembly.

This and other objects are attained, in a motorcycle having a fairing assembly at a front upper portion of a body thereof, by an improvement comprising a head light disposed at a front end of the faring assembly, a meter unit indicative of running conditions of the motorcycle, the meter unit being disposed in front of a steering handle of the motorcycle, and turn signal units disposed on both sides of the fairing assembly, the turn signal units being each integrally formed with the fairing assembly, in which the fairing assembly is separated into upper and lower portions by a line connecting the head light to each of the turn signal unit, the fairing assembly including as the upper portion thereof a covering member for covering an upper portion of the head light and rearside of the meter unit, the covering member being hinged rotatably at a front end thereof.

According to another aspect of the present invention, the fairing assembly includes a shelf extending from a lower end of the meter unit substantially rearwardly.

BRIEF DESCRIPTION OF THE DRAWINGS

The present invention will be fully understood by the following description and drawings in which:

FIG. 1 is a side view of a motorcycle on which a fairing assembly is mounted according to the present invention;

FIG. 2 is a front view of the motorcycle shown in FIG. 1;

FIG. 3 is a perspective view of a front portion of the fairing assembly shown in FIGS. 1 and 2;

FIG. 4 is a cross-sectional view showing a connecting portion of a cover member used in the fairing assembly;

FIG. 7 is a cross-sectional view of the fairing assembly taken along the line VII—VII in FIG. 6.

DETAILED DESCRIPTION OF THE PREFERRED EMBODIMENTS

Figure 5:
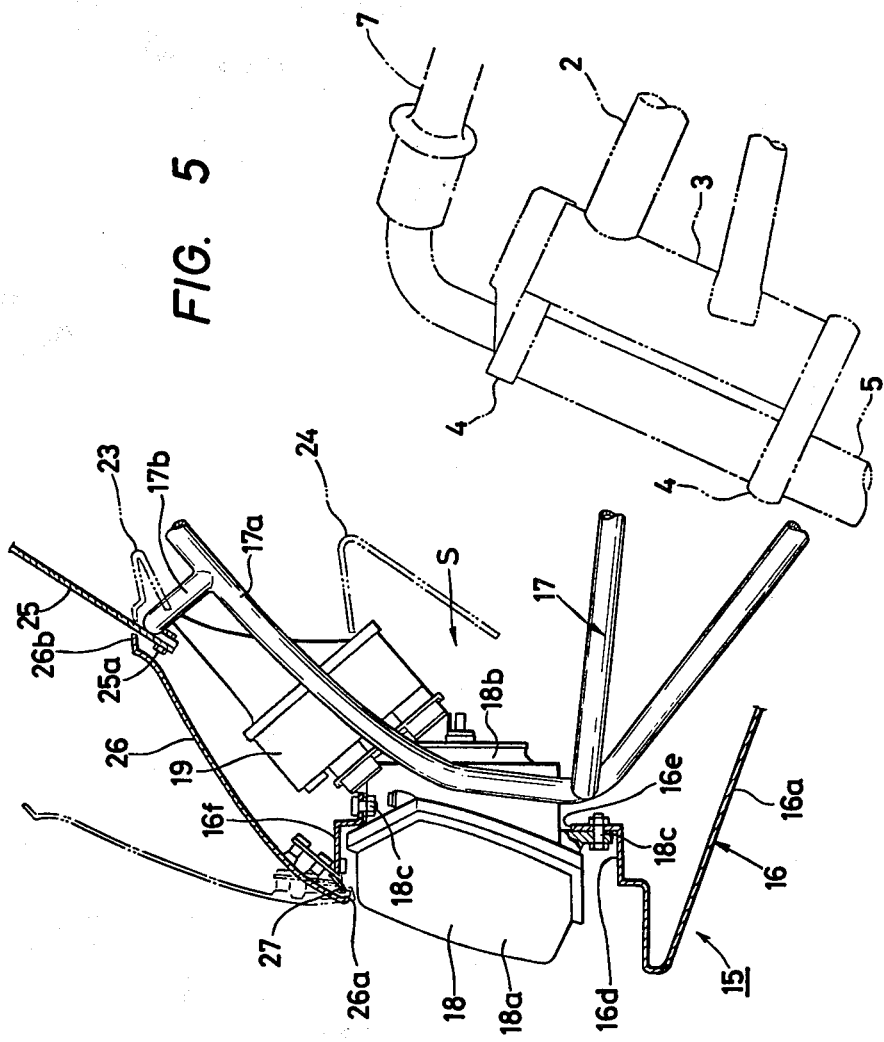
FIG. 5 is a cross-sectional view of the front portion of the fairing assembly.

The present invention will now be described in detail with reference to the accompanying drawings. A front fork 5 supporting a front wheel 6 is mounted rotatably on a pair of bridges 4 fixed to a head tube 3 formed at a front portion of a frame 2 (FIG. 5). A steering handle 7 is coupled to the front fork 5 at the upper bridge 4. As best shown in FIG. 1, there are provided a fuel reservoir 8, an engine 9, a seat 10 and a rear cowling 11 in a well known manner. A rear fork 12 supporting a rear wheel 13 is swingably provided extending from a lower portion of the frame 2 behind the engine 9 rearwardly. A rear cushion unit (not shown) is interposed between the rear fork 12 and the frame 2. A front fender 14 is provided so as to cover the upper portion and the rear portion of the front wheel 6. The fender 14 is mounted on an upper portion of a bottom casing 5a of the front fork 5. A cover portion 14a for determining a position of a conduit 6b for feeding a brake fluid to a brake device 6a for the front wheel 6 is provided at least on one side of the fender 14. The cover portion 14a is formed integrally with the fender 14. The front fender 14 is fixed to the bottom casing 5a at the upper and lower front edges of the cover portion 14a. The conduit 6b is positioned suitably by the rear surface of the bottom casing 5a and the cover portion 14a.

A fairing assembly 15 is provided so as to cover an upper front portion of the front fork 5 of the motorcycle 1, both side portions of an intermediate portion of the fuel reservoir 8 and front both sides of the engine 9. The fairing assembly 15 is formed by a plate-like material made of, for example, a synthetic resin. In the embodiment shown, the fairing assembly 15 is composed of a body 16, a covering 26 constituting a front upper portion of the assembly 15 and a window screen 25 obliquely provided on the covering 26.

As shown in FIG. 1, the fairing body 16 is provided with a front portion 16a extending toward the upper front portion of the front fork 5 at the front portion of the steering handle 7, an intermediate portion 16b extending to the both sides of the intermediate portion of the fuel reservoir 8, and side portions 16c suspending from the aforesaid intermediate portion 16b to both sides of the engine front portion. The fairing assembly 15 is streamlined in order to reduce aerodynamic resistance. The respective portions of the fairing body 16 are mounted at inner portions on a fairing stay 17 mounted on the front portion of the frame.

As shown in FIG. 5, a head light 18 is provided at an opening, directed upwardly, of the body 16 in the front portion 16a of the body 16. In the embodiment shown, the fairing may be separated into a body and a covering disposed thereabove, and therefore the lower portion and both side portions of the head light 18 are so constructed as to be confronted with a recess portion 16d formed in the front end portion of the front portion 16a of the body 16. The head light 18 is coupled at a front lower portion to an upper edge 16e of the recess portion 16d and is coupled at an upper portion to the stay portion 16f of the body by bolts 18c or the like as shown in FIG. 5. The head light 18 is exposed at a front portion 18a from the front portion of the body 16. The rear portion 18b of the head light 18 is received in a space S defined in the body 16.

Figure 6:
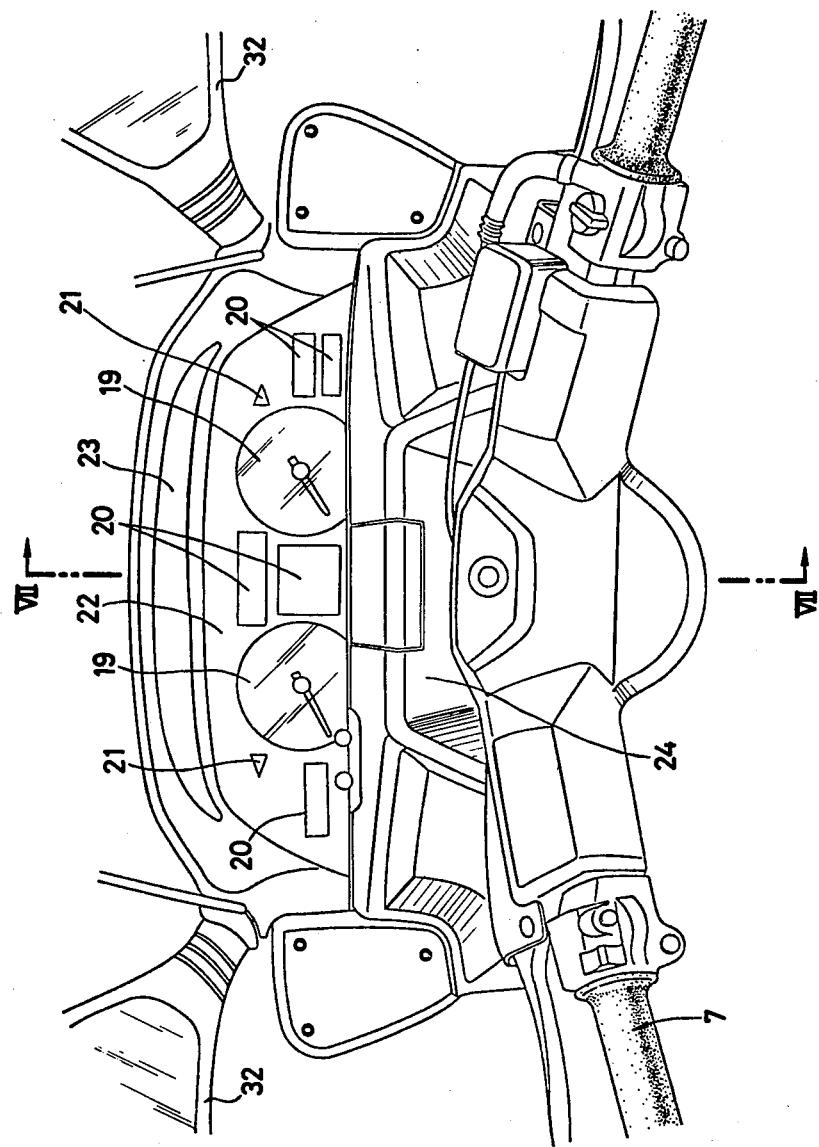
FIG. 6 is an inside view of the fairing assembly.

As shown in FIG. 6, meter unit 19 including a speedometer, tachometer and the like, other indicators indicative of the various engine running conditions and turn signals 21 are provided on the front side of the steering handle 7. These components are provided at a meter panel 22 dividing the handle front space and the above described space S of the fairing, in order to be confronted with the rider. The rearside of the meter unit 19 is protruded into the space S as shown in FIG. 5. The upper portion of the meter panel 22 is covered with a meter visor 23 and the lower portion of the meter unit 19 is covered by an inner panel or shelf 24. Reference numeral 32 denotes a pair of rear-viewing mirrors mounted on suitable places of the fairing assembly.

In FIG. 5, a mounting portion 17b of the stay 17 is formed on the front upper portion of a curved rising portion 17a. A window screen 25 obliquely rising toward the front upper portion of the body and having a U-shaped cross section is fixed to the mounting portion 17b by bolts 25a or the like. At the same time, between the lower portion of the window screen 25 and the front upper portion 16a of the body 16 is interposed a covering member 26 for covering the above described space S. The covering member 26 is also adapted to cover the upper portion of the front portion 18a of the head light 18 with a lower peripheral edge 26a. Therefore, the head light 18 is received in the recess portion extending in the longitudinal direction of the motorcycle and defined in the front end portion of the fairing. The covering member 26a is pivotally mounted on the above described stay 16f at a lower end by a hinge 27 so that it is swingable forwardly or rearwardly around the hinge 27 to thereby close the space S. The covering member 26 is so constructed as to cover the front surfaces of the mounting bolts 25a at the lower portion of the window screen 25, when the covering member 26 is closed. In the closed condition, the front surface circumferential portion of the lower end portion of the screen 25 is covered by the covering member to conceal the bolts 25a, thereby enhance the aesthetic appearance.

As best shown in FIGS. 3 and 4, the covering member 26 has an inverted U-shaped cross section and mounting holes 26d at the upper end portions of the both side portions 26c. The covering member 26 is secured by bolts 28 through mounting holes 26d to insert nuts 23b each provided at both side end portions 23a of the meter visor 23, for example. In the embodiment shown, the rear end portion 25b of the window screen 25 is interposed into this interval defined by the meter visor 23 and the covering member 26, the three members being thus coupled to each another. The upper portion of the covering member 26 is made free by removing the bolts 28. The covering member 26 is made as a hinge at the front lower end and is openable to release the space S for maintenance works of the head light, the meter unit and the like.

As shown in FIG. 3, at the rear portions of an alignment surface 16g on each front side upper periphery of the body 16 and an alignment surface 26e of the front lower portion on each side of the covering member 26, a front turn signal units 29 is provided in order to impart a flush or integral surface thereat. Each turn unit 29 is substantially in the form of a triangular pyramid-shape as shown in FIGS. 1 to 3. The lower portion of the turn signal unit 29 is held at the alignment surface 16g and the upper portion thereof is held at the alignment surface 26e. Therefore, the alignment surface 26e of the front portion of the covering member 26 is formed in a straight line whereas the rear alignment surface 26f is curved obliquely upwardly along the configuration of the upper portion of the turn signal unit 29. The straight alignment surfaces 16g and 26e of the body 16 and the covering member 26 have short lengths in the longitudinal direction, which facilitates manufacturing.

As described above, according to the present invention, since the covering member 26 is also used as a component of the fairing, the aesthetic appearance is enhanced. By opening the covering member 26, it is possible to carry out the maintenance work of meter units and indicators and the bulb exchanging of the head light. In particular, turn signal units are provided in order to enhance the flush appearance between the lower portion of the fairing and the covering member constituting the upper portion of the fairing, and the respective alignment surfaces are formed on the front side, as a result of which these portions have short lengths. It is therefore possible to mold them and it is easy to process the alignment surfaces. Furthermore, the opening area of the covering member may be increased to thereby facilitate the maintenance works.

Another embodiment of the present invention will now be described with reference to FIG. 7, in which the like components are designated by the same numerals used in the preceding embodiment. In FIG. 7, reference numeral 76 denotes a front lens for the meter unit 19, the front lens is directed somewhat downwardly, thereby preventing accumulation of dusts and sands on an outer surface of the front lens 76. A shelf 77 projecting from a lower end of the front lens 76 rearwardly is formed integrally with the inner wall of the fairing 15. Also a downwardly extending wall 78 for defining a space S is suitably formed integrally with the shelf 77. In the same manner as described above, the head light 18 and the like are received in the space S.

A fuse box 80 in which a plurality of fuses 79 are encased is formed to be flush with a shelf 77. Parts of the shelf 77 and a downwardly extending wall 78 are removable as a cover 81 for the box 80. It is preferable to apply to the shelf a color, such as black, which has a chromatic absorption characteristic. The rear end of the shelf 77 should be positioned behind upper and lower ends of the front lens 76.

With such a construction, during a running condition of the motorcycle, even if dusts and sands are blown upwardly, the dusts and sands scarcely reach the front lens 6, thereby keeping the front lens clean.

What is claimed is:

1. In a motorcycle having a fairing assembly (15) at a front upper portion of a body thereof, an improvement comprising a head light (18) disposed at a front end of said fairing assembly (15), a meter unit (19) indicative of running conditions of said motorcycle, said meter unit (19) being disposed in front of a steering handle (7) of said motorcycle, and turn signal units (29) disposed on both sides of said fairing assembly (15), in which said fairing assembly (15) is separated into upper and lower portions (26, 16) by a line connecting said head light (18) to each of said turn signal units (29), said turn signal units (29) being each integrally formed with one portion of said fairing assembly (15); said upper portion (26) being adapted to cover an upper portion of said head light (18) and a rearside of said meter unit (19), said upper portion (26) being hinged rotatably at a front end thereof.

2. The improvement of claim 1, in which said upper and lower portions (26, 16) are continuously flush with each other, and on either side, said upper portion (26) includes an alignment surface (26e) and said lower portion (16) includes an associated alignment surface (16g), said line being defined by said alignment surfaces (26e, 16g) when said upper portion (26) is closed, so that said line may be reduced in length by each of said turn signal units (29).

3. The improvement of claim 1, in which said fairing assembly (15) includes an opening through which a front fork (5) of the motorcycle is extending and a shelf (24, 77) extending from a lower end of said meter unit (19) substantially rearwardly.

4. The improvement of claim 3, in which said shelf (24, 77) includes a fuse box (80) flush with said shelf (24, 77).

* * * * *